United States Patent [19]

Wood

[11] 4,268,020
[45] May 19, 1981

[54] SUPPORT DEVICE FOR AUTOMOTIVE BODY PARTS

[76] Inventor: Arthur E. Wood, Rte. 3, Box 3, Cambridge, Minn. 55008

[21] Appl. No.: 65,130

[22] Filed: Aug. 9, 1979

[51] Int. Cl.³ .............................................. B25B 11/00
[52] U.S. Cl. ..................................... 269/88; 269/166; 269/296; 269/901
[58] Field of Search ................... 248/166, 438; 108/12, 108/128; 269/88, 17, 321 CF, 166, 296, 297

[56] References Cited

U.S. PATENT DOCUMENTS

| | | | |
|---|---|---|---|
| 1,215,689 | 2/1917 | Neff | 108/128 X |
| 1,653,764 | 12/1927 | Goodwin | 248/166 X |
| 3,858,864 | 1/1975 | Waldow | 269/17 |
| 4,029,308 | 6/1977 | Mathers | 269/17 |
| 4,148,504 | 4/1979 | Rushing | 248/166 X |
| 4,183,511 | 1/1980 | Marek | 269/17 |

Primary Examiner—Robert C. Watson
Attorney, Agent, or Firm—Williamson, Bains, Moore & Hansen

[57] ABSTRACT

A support device for automotive body parts includes a rectangular frame pivotally connected to a U-shaped support frame for pivoting movement between collapsed and erect positions. The support frame is provided with a pair of brackets which cooperate with the support frame for supporting an automotive body part thereon in generally inclined relation. A table frame is pivotally connected to the rectangular frame and when pivoted to a raised position cooperates with the rectangular frame to support an automotive body part horizontally thereon.

3 Claims, 3 Drawing Figures

U.S. Patent     May 19, 1981     4,268,020

SUPPORT DEVICE FOR AUTOMOTIVE BODY PARTS

SUMMARY OF THE INVENTION

This invention relates to support devices and more particularly to a support device for automobile body parts such as doors, hoods, fenders and the like.

In automobile body shops, mechanics often use sawhorses or other makeshift supports for supporting body parts upon which work is to be done. These makeshift support means occupy substantial volumetric space and, when not in use, diminish the available work space in the body shop. Further, these makeshift support means do not always permit the mechanic to arrange the supported body parts in positions for work to be optimally performed on the supported body parts.

Therefore, it is a general object of this invention to provide a novel support device, of simple and inexpensive construction, for supporting automobile body parts, the support device being readily foldable, when not in use, to a collapsed structure of small compass for convenient storage.

A more specific object of this invention is to provide a novel support device for supporting automobile body parts including a foldable, portable frame which permits the body parts to be supported in different positions.

These and other objects and advantages of this invention will more fully appear from the following description made in connection with the accompanying drawings, wherein like reference characters refer to the same or similar parts throughout the views.

FIGURES OF THE DRAWINGS

DESCRIPTION OF THE PREFERRED EMBODIMENT OF THE INVENTION

Figure 1:
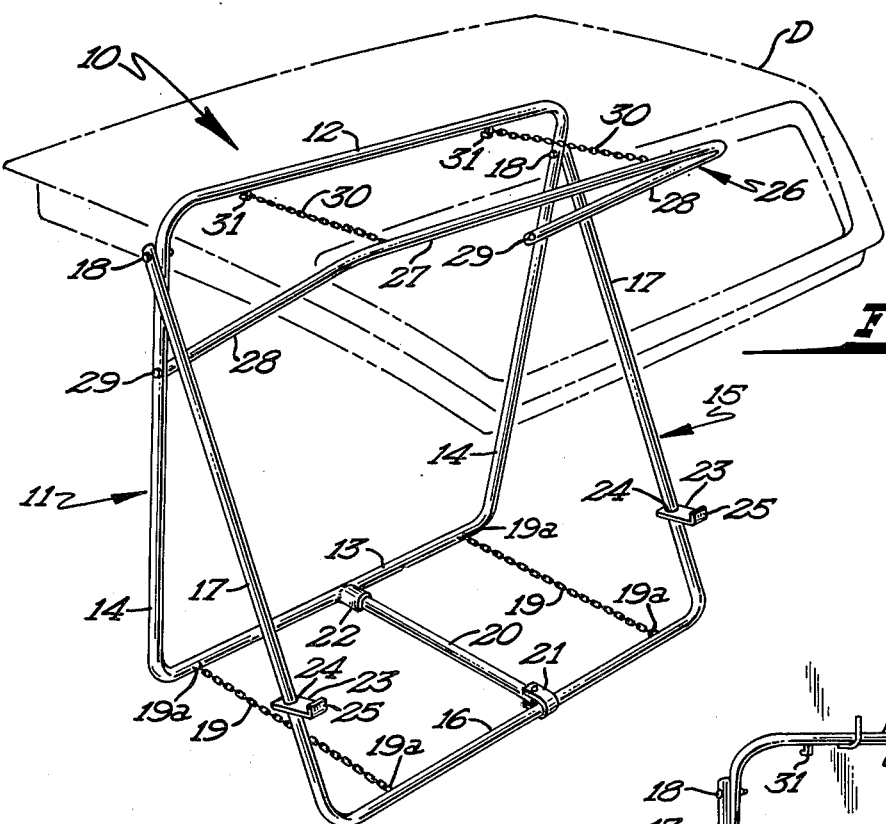
FIG. 1 is a perspective view of the support device illustrated in an unfolded erect position and illustrating an automobile part supported horizontally thereon by dotted line configuration.

Referring now to the drawings, it will be seen that one embodiment of the novel support device, designated generally by the reference numeral 10, is there-shown. The support device 10 includes a generally rectangular shaped frame 11 formed of suitable metal stock, preferably steel, aluminum or the like. The rectangular frame 11 includes an upper transverse frame member 12, a lower transverse frame member 13, and a pair of vertical frame members 14 which are disposed in substantially parallel relation.

Figure 2:
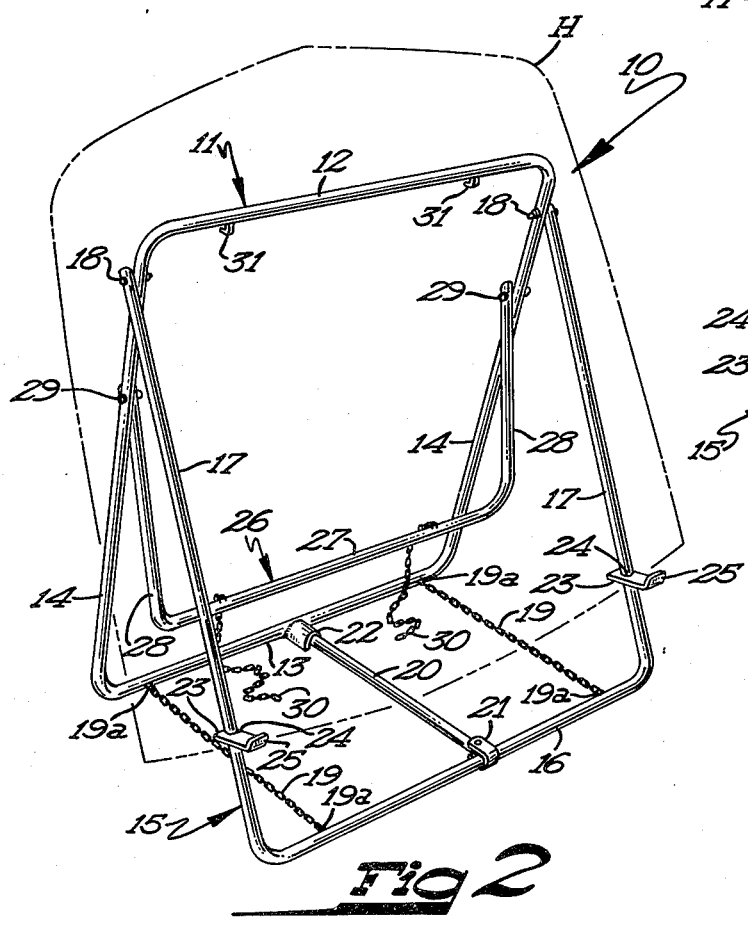
FIG. 2 is a perspective view similar to FIG. 1 and illustrating an automobile part supported in a different position thereon by dotted line configuration.
Figure 3:
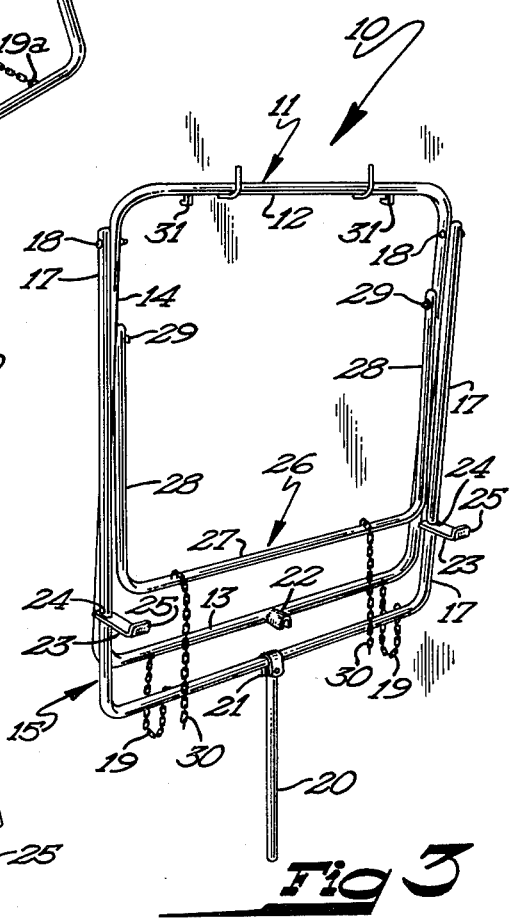
FIG. 3 is a perspective view of the support device illustrated in a collapsed position and suspended from a bracket support.

The support device 10 also includes a U-shaped support frame 15 also formed of a suitable metal and including a transverse frame member 16 having a vertical frame member 17 integral therewith and extending in substantially right angular relationship therefrom. The upper end of each vertical member 17 is pivotally connected to one of the vertical frame members 14 adjacent the upper end of the latter by means of a pivot 18. It will therefore be seen that the rectangular and U-shaped support frame are pivotally mounted together for swinging movement between a folded collapsed position, as illustrated in FIG. 3, and in erect unfolded position, as illustrated in FIGS. 1 and 2.

In this regard, it will be seen that when the rectangular frame 11 and the U-shaped support frame 15 are in the collapsed position, the frame members are disposed in substantially side-by-side relation. However, when the rectangular frame and U-shaped support frame are in the erect unfolded position, the frames diverge angularly downwardly with respect to each other.

In this regard, means are provided for limiting swinging movement of the frame members in an unfolding direction, and this means includes a pair of flexible chain elements 19 secured to the lower transverse frame member 13 and to the transverse frame member 16 by means of U-shaped attachment elements 19a. Means are also provided for stabilizing the rectangular frame and the U-shaped support frame in the erect position and this means includes an elongate tubular brace 20 which is pivotally connected to the transverse frame members 16 and the U-shaped support frame by means of a pivot strap 21. The brace 20 is therefore secured to the U-shaped support frame for pivoting movement relative thereto about an axis defined by the transverse frame member 16. A U-shaped strap retainer 22 is rigidly affixed to the central portion of the lower transverse frame member of the rectangular frame 11 and projects therefrom. The U-shaped retainer 22 is adapted to frictionally engage the end portion of the brace 20 to releasably retain the latter in engaging relation and prevent accidental collapsing of the rectangular and U-shaped support frames.

The support frame 15 is also provided with means thereon for supporting automobile body parts thereon in inclined relation and this means includes a pair of brackets 23 each having an opening 24 therein. The opening 24 in each bracket 23 accommodates one of the vertical frame elements 17 therethrough. Each bracket 23 is also provided with an upturned retaining lip or flange 25. The brackets 24 frictionally engage the associated vertical frame member 17 and are vertically adjustable thereon and serve to support an automobile body part thereon.

The support device 10 also includes a U-shaped table frame 26 comprised of a transverse frame member 27 and a pair of spaced apart generally parallel elongate longitudinal frame members 28 integral with the transverse frame member 27 and extending in substantially right angular relation thereto. It will be noted that each longitudinal frame member 28 is pivotally connected at its outer end by means of a pivot 29 to one of the vertical frame members 14 intermediate the ends of the latter. Thus, it will be seen that the pivot connection 29 between the table frame 26 and the rectangular frame 11 is located below the pivot connection 18 between the rectangular frame 11 and the U-shaped support frame 15.

The table frame 26 is swingable from a lowered, collapsed position, as illustrated in FIGS. 2 and 3, and a raised position, as illustrated in FIG. 1. It will be noted that when the table frame is in the raised position, the table frame diverges upwardly with respect to the rectangular frame 11. Means are also provided for retaining the table frame in a raised position and this means includes a pair of flexible chain elements 30, each being secured at one of its ends to the transverse frame member 27. Each chain element 30 also releasably engages one of a pair of L-shaped retainer elements 31 depending from the upper transverse frame member 12 of the rectangular frame 11, as best seen in FIG. 1.

In use, a user may easily and quickly shift the support device from a collapsed position, as illustrated in FIG. 3, to an erect position, as illustrated in FIG. 2. To shift the support device to an erect position it is only necessary to pivot the U-shaped support frame and rectangular frame relative to each other to the unfolded position and to secure the brace 20 in frictional engagement with the U-shaped strap retainer 22. The support device when unfolded to the erect position, as illustrated in FIG. 2, will be self-supporting. A user may then adjust the brackets 23 to the desired vertical position with respect to the vertical frame members 17 and thereafter place an automobile body part in supported relation on the support device.

Referring now to FIG. 2, it will be seen that an automobile hood is illustrated as supported on the brackets 23 and being disposed in inclined supported relation on the support device. This arrangement permits a mechanic to paint or perform other work on the hood or other body parts as required. In some instances, it is desirable to position the body part, such as the door D illustrated in FIG. 1, in horizontally supported relation. Thus, the mechanic will shift the table frame to the raised position and secure the ends of the flexible chain elements 30 to the L-shaped retainer element 31. The flexible elements will retain the table frame member in the raised position by action of gravity and a car part, such as a door D, may be positioned in supported relation on the support device. In this regard, the body part will be supported upon the upper transverse frame member 12 of the rectangular frame 11 and the transverse frame 27 of the table frame 26. The spacing between the transverse frame member 12 and transverse frame 27 of the table frame 26, when the latter is in the raised position, is sufficient to provide a stable support for a large body part such as a door. It is preferred that the transverse frame member 12 and the transverse frame member 27 be disposed in substantially coplanar relation when the table frame is in the raised position.

When it is desirable to collapse the support device, the mechanic will be required to merely detach the ends of the flexible chain elements 30 from the L-shaped retainer elements 31 and to disengage the brace 20 from frictional engagement with the strap retainer 22 and the entire support frame will be collapsed to a structure of small compass. The support device is of light-weight construction and may be readily carried to suitable hangers or brackets and suspended from a wall of the body shop as illustrated in FIG. 3. When the support device is in a suspended position as illustrated in FIG. 3, it occupies very little space but may be readily erected with a minimum of effort when desired.

Thus, it will be seen that I have provided a novel, portable, light-weight, readily collapsible support device which is especially adapted for use in supporting large automobile body parts for work to be done thereon.

It will therefore be seen that I have provided a portable, collapsible support device for supporting automobile body parts thereon, which is not only of simple and inexpensive construction, but one which functions in a more efficient manner than any heretofore known comparable device.

It is anticipated that various changes can be made in the size, shape and construction of the collapsible support device disclosed herein without departing from the spirit and scope of my invention as defined by the following claims.

What is claimed is:

1. A collapsible support device for supporting body parts of an automobile such as doors, hoods, fenders and the like, comprising:

a rectangular frame including spaced apart substantially parallel upper and lower transverse frame members and a pair of substantially parallel generally vertical frame members integral with said transverse frame members, a generally U-shaped support frame comprising a lower transverse frame member and a pair of vertical frame members integral with said transverse frame members and extending angularly therefrom, means pivotally connected to the upper end portion of each vertical frame member of the U-shaped support frame with the upper end portion of a vertical frame member of the rectangular frame to permit pivoting movement of the frames with respect to each other between folded, collapsed and unfolded, erect positions, said frame members when in the collapsed position being disposed in substantially side-by-side relation, and when in the unfolded erect position diverging angularly downwardly with respect to each other, means interconnecting the transverse frame member of the U-shaped support frame with the lower transverse frame member of the rectangular frame to limit movement of the frames in an unfolding direction, a pair of support elements each being adjustably mounted on the vertical frame members of said U-shaped support frame and cooperating with the rectangular and support frames when the latter are in the unfolded erect position for supporting an automotive body part such as a door, hood, fender or the like in inclined position thereon, a U-shaped table frame including a transverse frame member and a pair of longitudinal frame members integral with and extending angularly from the transverse frame member, means pivotally connecting each longitudinal frame member of the table frame with one of the vertical frame members of the rectangular frame to permit pivoting movement of the table frame between the raised and lowered positions, the table frame when in the lowered position being disposed in substantially side-by-side relation with the rectangular frame, said table frame when in the raised position extending angularly upwardly from the rectangular frame and cooperating with the latter for supporting an automotive body part such as a door, hood, fender or the like thereon, and means on said rectangular frame engaging said table frame for releasably retaining the latter in the raised position.

2. The support device as defined in claim 1 and a rigid retaining member pivotally connected to one of said rectangular or support frames, and means on the other of said support or rectangular frames for releasably engaging said rigid retaining member when said frames are in the erect position.

3. The support device as defined in claim 1 wherein said support elements are each provided with a lip for engaging the body part supported on said support elements.

* * * * *